US010227432B2

United States Patent
Carver et al.

(10) Patent No.: US 10,227,432 B2
(45) Date of Patent: Mar. 12, 2019

(54) FORMATION OF XYLYLENE TYPE COPOLYMERS, BLOCK POLYMERS, AND MIXED COMPOSITION MATERIALS

(71) Applicant: Carver Scientific, Inc., Baton Rogue, LA (US)

(72) Inventors: David R. Carver, Baton Rogue, LA (US); Robert G. Carver, Austin, TX (US); Bradford Fulfer, Baton Rogue, LA (US); Jaime Gibbs, Baton Rogue, LA (US)

(73) Assignee: Carver Scientific, Inc., Baton Rouge, LA (US)

( * ) Notice: Subject to any disclaimer, the term of this patent is extended or adjusted under 35 U.S.C. 154(b) by 1026 days.

(21) Appl. No.: 14/499,028

(22) Filed: Sep. 26, 2014

(65) Prior Publication Data

US 2015/0017342 A1     Jan. 15, 2015

Related U.S. Application Data

(63) Continuation-in-part of application No. 14/156,457, filed on Jan. 16, 2014, now Pat. No. 8,940,850, and a
(Continued)

(51) Int. Cl.
*C08F 232/06* (2006.01)
*B05D 3/02* (2006.01)
(Continued)

(52) U.S. Cl.
CPC .............. *C08F 232/06* (2013.01); *B05D 1/60* (2013.01); *B05D 3/0218* (2013.01); *B05D 3/06* (2013.01);
(Continued)

(58) Field of Classification Search
CPC ....... C08F 232/06; B05D 1/60; B05D 3/0218; B05D 3/06; B05D 3/14; B05D 3/207; H01G 4/018
(Continued)

(56) References Cited

U.S. PATENT DOCUMENTS 2,798,990 A    7/1957   Davis
3,271,471 A    9/1966   Baker
(Continued)

FOREIGN PATENT DOCUMENTS

EP            1018527 A2 *   7/2000  ............... B05D 1/60
WO    WO 2009/046341 A1    4/2009
(Continued)

OTHER PUBLICATIONS

L.A. Errede and W.D. English, "Oxidation of p-Methylbenzyl Radical and p-Xylylene", Adv. in Chem.; Amer. Chem. Soc., Jan. 1965.*
(Continued)

*Primary Examiner* — Michael N Orlando
*Assistant Examiner* — Elizabeth Bradford
(74) *Attorney, Agent, or Firm* — Klarquist Sparkman, LLP

(57) ABSTRACT

A gaseous p-xylene monomer, formed by reacting xylene with a monatomic oxygen source, is mixed with a functional gaseous monomer. The resulting mixture may be deposited and solidified on a substrate, which may optionally be exposed to a photoinitiating light energy and/or a permittivity enhancing electric or magnetic field. Alternatively, the resulting gaseous mixture may be trapped and condensed in a condenser, which may contain a solvent to facilitate trapping. The condensate may be mixed with a tertiary substance, e.g., another monomer, a reactive substance or an inert material.

20 Claims, 4 Drawing Sheets

Related U.S. Application Data continuation-in-part of application No. 13/853,712, filed on Mar. 29, 2013, now Pat. No. 9,011,627, and a continuation-in-part of application No. 13/599,996, filed on Aug. 30, 2012, now Pat. No. 8,633,289.

(60) Provisional application No. 61/529,436, filed on Aug. 31, 2011.

(51) Int. Cl.
*B05D 3/06* (2006.01)
*B05D 3/00* (2006.01)
*B05D 3/14* (2006.01)
*B05D 1/00* (2006.01)
*H01G 4/018* (2006.01)

(52) U.S. Cl.
CPC .............. *B05D 3/14* (2013.01); *B05D 3/207* (2013.01); *H01G 4/018* (2013.01)

(58) Field of Classification Search
USPC ...................................................... 156/275.5
See application file for complete search history.

(56) References Cited

U.S. PATENT DOCUMENTS

| | | |
|---|---|---|
| 3,342,754 A | 9/1967 | Gorham |
| 3,616,314 A | 10/1971 | Settineri et al. |
| 3,907,748 A | 9/1975 | Marvel et al. |
| 4,359,327 A | 11/1982 | Armand et al. |
| 4,500,562 A | 2/1985 | Jahn et al. |
| 4,532,369 A | 7/1985 | Harner |
| 4,675,462 A | 6/1987 | Ungarelli et al. |
| 4,734,533 A | 3/1988 | Ungarelli et al. |
| 4,769,505 A | 9/1988 | Lee et al. |
| 4,795,838 A | 1/1989 | Bornengo et al. |
| 4,806,702 A | 2/1989 | Lee et al. |
| 4,816,608 A | 3/1989 | Bornengo et al. |
| 4,849,559 A | 7/1989 | Lee et al. |
| 4,853,488 A | 8/1989 | Ungarelli et al. |
| 4,886,923 A | 12/1989 | Ungarelli et al. |
| 4,942,061 A | 7/1990 | Domes |
| 5,110,903 A | 5/1992 | Lee et al. |
| 5,144,529 A | 9/1992 | Takahashi |
| 5,266,291 A * | 11/1993 | Drnevich ................ B01J 8/008 423/245.1 |
| 5,324,702 A | 6/1994 | Yoo et al. |
| 6,086,952 A | 7/2000 | Lang et al. |
| 6,107,184 A | 8/2000 | Mandal et al. |
| 6,709,715 B1 | 3/2004 | Lang et al. |
| 8,432,663 B2 | 4/2013 | Carver |
| 8,633,289 B2 | 1/2014 | Carver et al. |
| 8,940,850 B2 | 1/2015 | Carver et al. |
| 2006/0074164 A1 | 4/2006 | Slenes et al. |
| 2011/0275742 A1 | 11/2011 | Akkapeddi et al. |
| 2012/0241085 A1 | 9/2012 | Carver |
| 2013/0109827 A1 | 5/2013 | Carver et al. |
| 2013/0224397 A1 | 8/2013 | Carver |
| 2013/0229157 A1 | 9/2013 | Carver |
| 2014/0087207 A1 | 3/2014 | Zhao |
| 2014/0139974 A1 | 5/2014 | Carver et al. |
| 2014/0295101 A1 | 10/2014 | Carver |
| 2015/0000090 A1 | 1/2015 | Carver et al. |
| 2015/0000833 A1 | 1/2015 | Carver et al. |

FOREIGN PATENT DOCUMENTS

| | | |
|---|---|---|
| WO | WO 2014/035456 A2 | 3/2014 |
| WO | WO 2014/074122 A2 | 5/2014 |
| WO | WO 2014/161007 A2 | 10/2014 |

OTHER PUBLICATIONS

J.F. Gaynor et al., "A new method for fabricating high performance polymeric thin films", J. Mater. Res 11(7), Jul. 1996.*

Y. Elbasabi et al., "Multipotent Polymer Coatings based on chemical vapor deposition", Adv. Mater. 2006, 18, 1521-1526.*

R. H. Natelson, "Preignition and Autoignition Behavior of Xylene Isomers", Master of Science in Mechanical Engineering Thesis, Drexel University, 2010.*

J.L. Emdee, K. Brezinksky, I. Glassman, "High Temperature Oxidation Mechanism of m- and p-Xylene", J. Phys. Chem. 1991, 95, 1626-1635.*

International Search Report and Written Opinion from corresponding International Patent Application No. PCT/US15/50857, dated Dec. 15, 2014, 7 pp.

Battin-Leclerc et al., "Experimental and Modeling Study of the Oxidation of Xylenes," *International Journal of Chemical Kinetics*, 2006, 38(4):284-302, XP055249870, Apr. 2006.

* cited by examiner

FORMATION OF XYLYLENE TYPE COPOLYMERS, BLOCK POLYMERS, AND MIXED COMPOSITION MATERIALS

RELATED APPLICATIONS

This application is a continuation-in-part of U.S. nonprovisional application Ser. No. 14/156,457 filed on Jan. 16, 2014, issued as U.S. Pat. No. 8,940,850, and a continuation-in-part of U.S. nonprovisional application Ser. No. 13/853,712 filed on Mar. 29, 2013, issued as U.S. Pat. No. 9,011,627, each of which is a continuation-in-part of U.S. nonprovisional application Ser. No. 13/599,996 filed on Aug. 30, 2012, issued as U.S. Pat. No. 8,633,289, which claims the benefit of priority of U.S. provisional application 61/529,436 filed on Aug. 31, 2011, the entire contents of which are incorporated herein by reference and made a part hereof.

FIELD OF THE INVENTION

This invention relates generally to modifying p-xylylene produced in the presence of $N_2O$ or a reactive oxygen, under atmospheric pressure, and/or without the need of a vacuum, by adding compounds to provide functionalized surfaces.

BACKGROUND

The preparation of p-xylylene and functionalized p-xylylene from paracyclophanes is well known, and the subsequent polymerization and copolymerization reactions have been explored extensively over many decades. By far, the most common mode of p-xylylene formation utilizes the Gorham method (U.S. Pat. No. 3,288,728 A). This method typically involves pyrolytic cleavage of paracyclophanes, its functionalized derivatives, or p-xylene to yield p-xylylene di-radicals (M. Szwarc et al., *Disc. Faraday Society*, 46, 1947), which polymerize to form poly-p-xylylene (also known as parylene) polymers and copolymers. Preparation of bulk p-xylylene, from pyrolysis to deposition, via this route requires low pressure (0.1 to 0.2 Torr) for the entirety of the process. This process is well known to those versed in the field of parylene thin film chemistry.

In early processes by Gorham and Errede (Errede, L. A. and Hoyt, J. M., *J. Am. Chem. Soc.*, 82, 1960, 436-439), pre-formed p-xylylene from the above describe pyrolysis held at sub-zero temperatures (typically −78° C.) under vacuum, was introduced slowly to a heated (>90° C.) secondary monomer, either neat or in a solvent such as hexanes, toluene, or p-xylene, in such a manner that the second monomer was always in excess to the p-xylylene monomer. This encouraged reaction of the highly reactive xylylene monomer with the less reactive secondary monomer. It was only in this fashion that appreciable copolymerization occurred. When xylylene was in excess to the secondary monomer, self-polymerization was the dominant reaction. The reaction was allowed to warm to room temperature, at which point bulk polymer was formed and isolated from the mother liquor.

More recently, chemical vapor deposition (CVD) processes for the formation of xylylene copolymeric thin films have replaced the solution phase bulk polymer syntheses. Morozov et al., Elkasabi et al., and Gaynor et al. (Morozov et al., *Pol. Sci. Ser. A*, 54, 2012, 330-342; Elkasabi, et al., *Adv. Mater.*, 18, 2006, 1521-1526; Gaynor, et al., *J. Mat. Res.*, 11, 1996, 1842-1850) are among several reports that utilize vacuum vapor deposition of p-xylylene with a number of radical reactive electrophilic monomers including, p-phenylenevinylene, amine and ketone containing [2,2] paracyclophanes, and vinylic monomers (N-phenyl maleimide), respectively.

There existed a need for a simple, rapid, inexpensive method for the formation of xylylene monomers. The process for forming parylene via the "Gorham method" utilizes costly subatmospheric pressure environments and reagents, such as paracyclophanes. To reduce costs associated with producing parylene thin films, the most demanding market for this polymer, the Puralene™ process (Carver, U.S. Pat. No. 8,633,289) was invented. The Puralene™ process converts p-xylene into p-xylylene in the presence of $N_2O$ or a reactive oxygen, under atmospheric pressure, and/or without the need of a vacuum. This process is comparatively inexpensive and produces a conformal thin film ranging from nanometers to microns in thickness.

The processing parameters of the Gorham process and related processes are not conducive to adding polymerizable molecules to p-xylylene during formation. Thus, functionally limited p-xylylene products may be formed using such processes.

There is a need for improvements to the p-xylylene polymers. The invention is directed to overcoming one or more of the problems and solving one or more of the needs as set forth above.

SUMMARY OF THE INVENTION

To solve one or more of the problems set forth above, in an exemplary implementation of the invention, a method providing access to reactive "xylylene type" monomers enables production of desirable copolymers, block polymers, and composite materials. Targeted applications for the method include film coatings for protective finishes, electronic components such as capacitive dielectric film, cloth coatings, 3D printer materials, biological coatings for derivatives and binding, bulk polymer machined products, plastic injection molding (thermoset and thermoplastics), and other areas where the properties of an inexpensive readily produced organic polymer can be utilized.

A process to make a xylylene monomer or other monomer according to principles of the invention, is referred to herein as the "Carver Process". The monomer is referred to as "Puralene monomer." With modifications to the reactor described in U.S. Pat. No. 8,633,289, a second monomer is introduced in the vapor phase, and the combined gases are co-deposited on a substrate, such as, but not limited to, films, electrodes, paper, cloth, etc. Respecting boiling point and decomposition temperatures of the particular compounds being used, a multitude of secondary monomers containing functional groups capable of undergoing radical or addition polymerization may be utilized to make copolymer thin film coatings. Such monomers may include but are not limited to olefins, vinyl derivatives, alkynyl derivatives, acryl compounds, allyl compounds, carbonyls, cyclic ethers, cyclic acetals, cyclic amides, and oxazolines. Other organic macromolecules such as proteins, carbohydrates, polyisocyanates, and DNA/RNA molecules may also be copolymerized or reacted with the xylylene monomer. Similarly, block copolymers and mixed composition (i.e., composite) materials can be synthesized using the methods described herein.

A method of modifying p-xylylene monomer according to principles of the invention entails reacting xylene with a monatomic oxygen source to produce p-xylylene in monomeric form, as in the Carver process for Puralene formation. By way of example, the monatomic oxygen source may comprise nitrous oxide or ionized diatomic oxygen. In a preferred implementation, the step of reacting xylene with a monatomic oxygen source to produce p-xylylene in monomeric form is performed at atmospheric pressure, in an environment heated to 350° C. to 800° C., at stoichiometric ratio of xylene to monatomic oxygen source. The p-xylylene in monomeric form is mixed with a copolymerization compound, i.e., a compound that copolymerizes with the p-xylylene in monomeric form. The p-xylylene in monomeric form and the copolymerization compound are in gaseous form while mixing. After mixing, the mixed gases form a mixture.

In one implementation, the copolymerization compound is an olefinic compound, such as 2-carboxyethyl acrylate, α-terpinene, cyclohexene, (R)-(+)-limonene, linalool, dipentene, (-)-(α)-pinene, (R)-(-)-carvone, 3-(trimethoxysilyl)propyl methacrylate, or (+)-(α)-terpinene.

After mixing the p-xylylene in monomeric form with a copolymerization compound, the resulting mixture may be deposited on a substrate. Temperature of the substrate may be controlled to promote solidification of the deposited mixture. Optionally, the deposited mixture may be exposed to a photoinitiating light energy and/or a permittivity enhancing field, such as a magnetic and/or electric field.

After mixing the p-xylylene in monomeric form with a copolymerization compound, the resulting mixture may be trapped in a condenser. The condenser has a temperature at which condensation of the mixture takes place. A temperature of at least −30° C., e.g., in the range of −30° C. to 400° C., allows condensation for most such mixtures. The condenser containing a solvent to facilitate trapping. Optionally, the trapped mixture may be mixed with a tertiary substance, e.g., another monomer, a reactive substance or an inert material.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
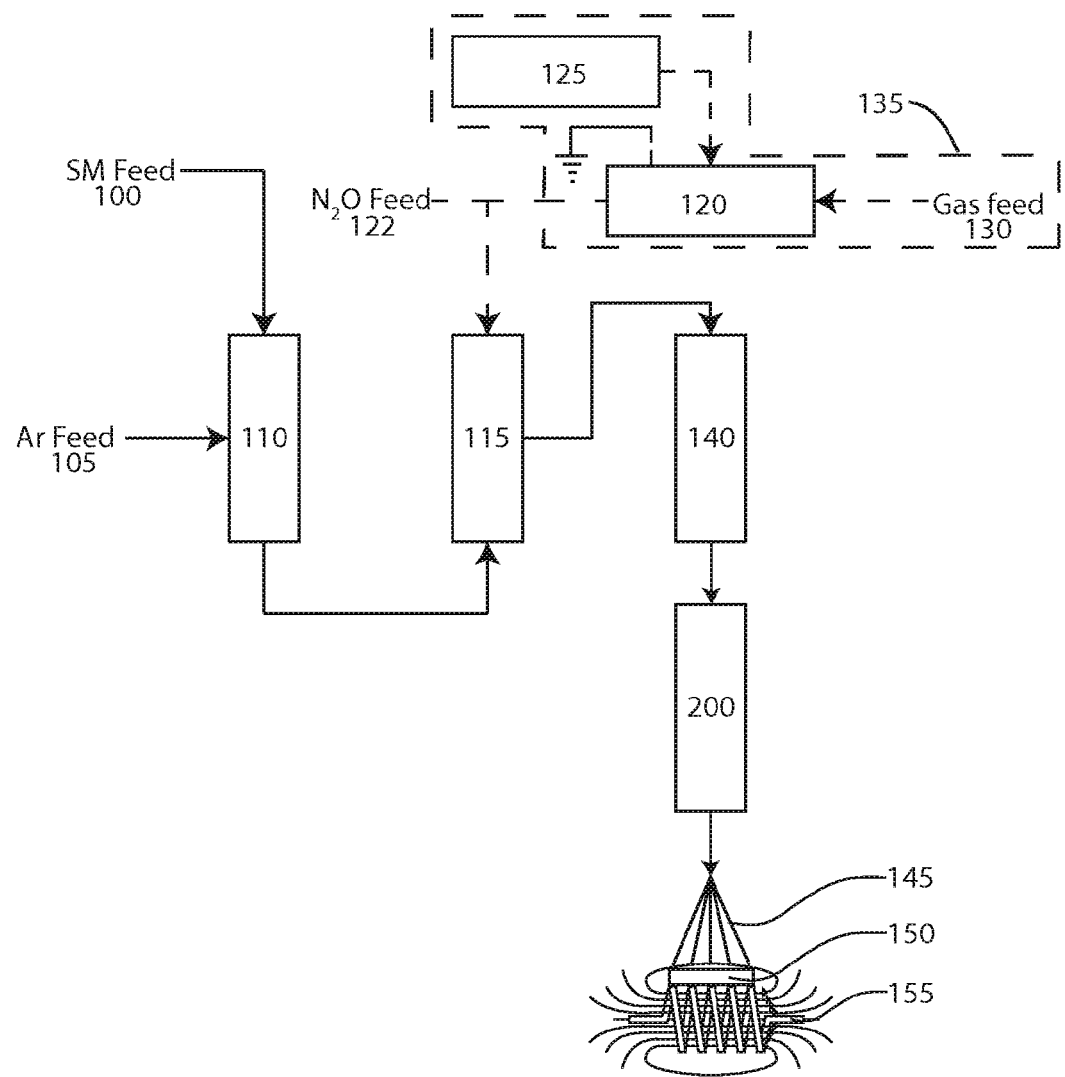
FIG. 1 is a high level flow diagram that conceptually illustrates a method for producing a polymer according to principles of the invention.

Referring now to FIG. 1, a high level flowchart that illustrates an exemplary method of producing an augmented permittivity material, e.g., Puralene™, for use as a coating in a capacitor according to principles of the invention is shown. Sections, referred to as chambers, may comprise tanks having an inlet and an outlet or tubular structures with an inlet and an outlet. Chamber 110 is a heated tube or other evaporation device intended to volatilize starting material feed 100. Starting material feed 100 is evaporated and mixed with inert gas 105 in chamber 110. Inert gas 105 may be any of a group, or a mixture of, inert or essentially inert gases, such as, but not limited to, argon or nitrogen. Substitution of nitrogen for argon and/or other essentially inert gases is possible. Pumps and valves may be used to propel and control the flow of fluids from one station to another.

By way of example and not limitation, chamber 110 may comprise an electrically heated Inconel (nickel alloy 600) pyrolysis reaction tube. The tube is heated to a temperature of about 350° C. to 630° C. at atmospheric pressure. A flowing stream of argon gas alone, or with a reactive compound such as nitrous oxide, is supplied to the pyrolysis reaction tube. The starter material feed 100 may be xylene vapor (Aldrich #134449-4L). If the carrier gas 105 includes a reactive species or compound (e.g., $N_2O$), the ratio of gases is adjusted to provide approximately molar stoichiometric ratios of 1:1 of the reactive species or compounds (xylene to nitrous oxide).

The heated starter material 100 in the volatile mixture with inert gas reacts with monatomic oxygen in reaction chamber 115. Being very reactive and transient, monatomic oxygen must be available to react with the volatile mixture in the reaction chamber 115. As discussed above, the source of monatomic oxygen may be a gaseous compound supplied with the carrier gas 105, or a gaseous compound supplied separately 122, or another source, such as a plasma generator 135.

Monatomic oxygen plasma may be created by exposing oxygen ($O_2$) gas to an ionizing energy source, such as an RF discharge, which ionizes the gas. Alternatively, a compound such as Nitrous Oxide ($N_2O$) may supply monatomic oxygen for the reaction through thermal, catalyzed, and/or other decomposition. Thus, a monatomic oxygen plasma generator 135, or a monatomic oxygen chemical compound (e.g., $N_2O$) feed 122, or another suitable source of monatomic oxygen is provided.

A plasma gas can be used with the aforementioned starting materials to form the intermediate oxidized products that may subsequently react to form reaction products that are oxidized forms of the starting materials which may be monomers, dimers, trimers, oligomers, or polymers. The plasma generator 135 includes a gas feed 130 that supplies gas to a plasma reaction chamber 120. A plasma driver 125 provides energy to ionize the gas.

The ratio of gases is adjusted to provide approximately molar stoichiometric ratios of 1:1 (xylene to nitrous oxide or xylene to monatomic oxygen). Illustratively, increased amounts of nitrous oxide result in partial and/or complete oxidation of xylene with reduced formation of the desired cyclophane or its polymer. Close control of the stoichiometric ratios of the reactants is desired in this reaction.

The reaction products are supplied to a reaction chamber 140, which is heated to approximately 350° C. to 800° C. to facilitate vaporization of the reaction products. At higher temperatures (650° C. to 800° C.) the output of the reaction chamber 140 is sufficiently hot enough to maintain the monomer p-xylylene in monomeric form.

The monomer from the reaction chamber 140 then proceeds through a modifying subsystem 200. The modifying subsystem 200, which is described more fully below, modifies the p-xylylene monomer by adding compounds to ultimately provide different polymers.

Condensation of the gas into a cooled surface resulted in the deposition of a colorless to cream colored solid. Without modification in the subsystem 200, this gaseous material mixture is solidified into a polymeric material.

Rapidly cooling of the monomer (whether modified or unmodified) while directing it onto a surface 150 results in a liquid condensation of the monomer and rapid polymerization of the monomer into a polymer. Comparison of the film produced without modification in the subsystem 200, appears to be identical to parylene film formed by the conventional vacuum pyrolysis of dimers produced by the Gorham process. Without augmentation of the Puralene™ polymer, permittivity of both solidified products is approximately 3, electric breakdown strengths are approximately identical at 100 V/micron, and solubility in both hot and cold solvents are below detectable levels.

In this reaction it is believed that the reactive p-xylylene reactive intermediate is formed. In comparison with the known "Gorham process", results in a vast improvement in the overall synthesis yield of the dimer and also results in a vast improvement in the purity of the dimer directly from the reaction. It is understood that variation in the stoichiometric amounts of the reactants may be adjusted to provide for greater or lesser yield with associated purities varying to provide a more economical process or better overall production efficiency without substantially deviating from the scope of this invention. Subsequent purifications of the materials from this reaction can be performed on this material in a manner that is much easier to accomplish than with previously taught processes. The reaction is shown below.

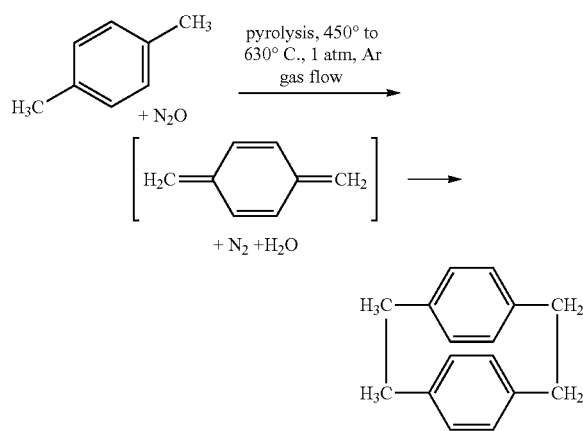

As the reaction temperature at station 140 is increased to >650° C., the deposition of the xylylene monomer can proceed directly onto a solid substrate target without necessity for isolating the intermediate dimer. Deposition of the exit gas at above 250° C. reaction temperature upon a cool (approx. <200° C.) glass plate resulted in formation of an ethanol insoluble substance that displays characteristics of a parylene polymer. Observed solubility characteristics clearly show that the material is insoluble in all common solvents (i.e. hexane, xylene, ethyl acetate, ethanol, water).

It is believed that the reaction mechanism proceeds through a route involving the prior decomposition of nitrous oxide. Nitrous oxide is an energetically unstable molecule that can be thermally decomposed at elevated temperatures. Measurements vary determining the temperature that pure thermal decomposition occurs, but estimates of 1100° C. are often cited. Products of the reaction are diatomic nitrogen and monatomic oxygen. The monatomic oxygen is able to react with itself to form diatomic oxygen, but this reaction is relatively slow. Catalysis of this reaction as shown below in equation 1 is known to occur with a variety of metal oxides and mixed metal oxides. Some temperatures used for nitrous oxide decomposition with certain catalysts are as low as 350° C.

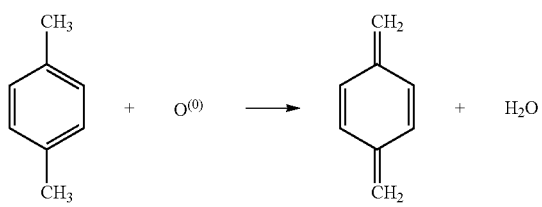

The reactive species for the process is very likely the monatomic oxygen produced from the decomposition of the nitrous oxide. In this sense, the nitrous oxide can be viewed as a convenient carrier for the delivery of the reactive intermediate, monatomic oxygen.

In a similar manner to the nitrous oxide reaction, pure diatomic oxygen can be utilized as a reactant. However, to produce substantial yields of the desired products, activation of the oxygen is necessary. It is believed that activation of the oxygen is due to the excitation of the oxygen molecule to produce monatomic oxygen as shown in Equation 3.

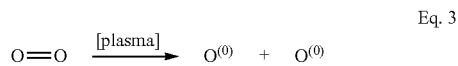

The reaction with monatomic oxygen produced in this manner thus proceeds in a manner similar to that of the nitrous oxide decomposition route.

Cooling of the elevated temperature gases 145 exiting from the reaction tube 135 is necessary. If the reaction gas is at too high of a temperature, the ability of the reactive intermediate to condense and adhere to a surface is greatly reduced. To this end, a device to mix cool nonreactive or inert gases into the hot reaction stream has been devised. The reaction may proceed at increased or decreased pressure (above or below atmospheric pressure). Accordingly, an expansion valve may be used at the exit of the reaction tube 135 to provide Joule-Thomson effect cooling of the hot gas when the gas is below its inversion temperature.

The method may be extended to other substituents such as the ones shown below.

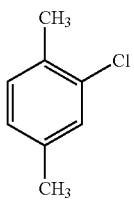
2-CHLORO-1,4-DIMETHYLBENZENE

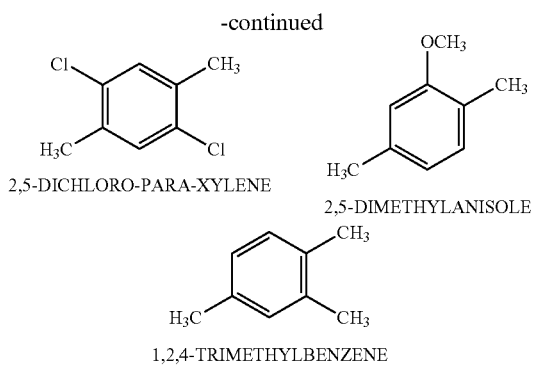

2,5-DICHLORO-PARA-XYLENE 2,5-DIMETHYLANISOLE 1,2,4-TRIMETHYLBENZENE

Substituents such as the ones noted above (chloro, dichloro, methoxy, and methyl) are not the only aromatic substituents that are capable of being modified by this process into reactive intermediates and their subsequent polymers. Additionally, paracyclophanes and compounds derived thereof are not exclusive to this process. Meta and ortho orientation of the substituents on the aromatic rings are also viable reaction starting materials. The reaction can be generalized to include all compounds that are capable of reaction with monatomic oxygen produced from a plasma or from decomposed oxygen-containing substances or its intermediate reaction products and also contain hydrogen atoms stabilized by the presence of an aromatic ring. Typically such hydrogen atoms are located in a position alpha to a phenyl ring (benzylic position). Michael structures removed from the alpha aromatic ring positions are known to give similar reactivity to the hydrogen alpha to the aromatic ring position as is well known to those versed in organic synthesis. However, the reactivity of such hydrogen atoms is not limited to alpha and/or Michael positions from an aromatic ring or the aromatic ring such as benzene. Other aromatic stabilizations are known for many different rings, fused rings, and non-ring systems, as known to those versed in the art of organic chemistry. Such starting materials may preferably have the presence of two hydrogen atoms that are capable of being removed to form partially oxidized starting materials. These preferred materials may optionally have the ability to dimerize, trimerize, oligiomerize, or polymerize. The nonlimiting example used herein is p-xylene.

In applications where an end-product exhibiting high permittivity is desired, one or more permittivity enhancing steps may be performed. Applications that benefit from a high permittivity include energy storage devices, such as capacitors.

One implementation of the invention augments permittivity of the polymer by exposing the condensing reaction products 145 (with or without modification in the subsystem 200), to a magnetic or electric field. To the output of the reactions described above, the gaseous stream of reaction product 145 is directed to a cool solid surface 150. Illustratively, the surface target 150 may be immersed in a magnetic field 155 such as that provided by a Neodymium magnet (S84, K&J Magnetics). Other magnetic field sources may be utilized and are intended to come within the scope of the invention. Condensation of the monomer and subsequent polymerization can proceed rapidly while in the magnetic field 155. If the target and the magnet maintain the same relative orientation during the polymerization process, then a baseline increase in the electrical permittivity has been shown to occur. If the orientation of the magnetic field 155 relationship to the target is rotated during the polymerization or solid phase condensation process, then the resulting permittivity has been shown to decrease.

When the reaction is conducted as noted above, using the p-xylene monomer (with or without modification in the subsystem 200) as the polymerization molecule(s), but without the presence of the applied magnetic field, the relative permittivity of the material deposited may, for example, be approximately 3. When such material is run as described with a magnetic flux 155 density of approximately 200 to 2000 Gauss, the relative permittivity may be approximately 7. Thus, the magnetic field has been shown to substantially increase the permittivity of the product by over a factor of 2 times. In a similar manner other salts, dipoles, and salts of organic acids can be entropically oriented during solidification or polymerizations to produce enhanced high permittivity materials. Improvements in permittivity from 10 to over 1000% may be attained.

In another implementation, the surface target 150 is immersed in an electric field 155 such as that provided by a high voltage power supply (G40, Emco, 4000V). Condensation of the monomer and subsequent polymerization can proceed rapidly while in the electric field. If the target and the electric field maintain the same relative orientation during the polymerization process, then a baseline increase in the electrical permittivity has been shown to occur. If the orientation of the electric field relationship to the target is rotated during the polymerization or solid phase condensation process, then the resulting permittivity has been shown to be lower.

Condensation of dielectric reaction products in the presence of an electric and/or magnetic field, has been shown to augment the permittivity of the condensed dielectric. This step may be applied to compounds other than parylene or Puralene® polymers.

When the condensation step is conducted as noted above, using a mixture of maleic acid salt with guanidine as a high dielectric material, but without the presence of the electric field the relative permittivity of the material deposited is approximately 500. When the material is processed as described with an electric field density of 10,000 to 30,000 V/m, the relative permittivity is approximately 25000 to 40000. Thus, the electric field has been shown to substantially increase the permittivity of the dielectric field by at least a factor of 25 in that particular case. In a similar manner other salts, dipoles, and salts of organic acids can be entropically oriented during solidification or polymerizations to produce enhanced high permittivity materials. Improvements in permittivity have been shown to range from 5 to over 10000%.

The use of electrical and/or magnetic fields during the condensation process modifies the mechanical strength of the product. The material may not be anisotropic after condensation in strong fields. Thus, this method could be utilized as a way of controlling the mechanical properties of the reaction products made by this procedure.

The thickness of a Puralen™ coating ? (with or without modification in the subsystem 200) may range from 5 to 30 nm to greater than 10 microns.

Figure 2:
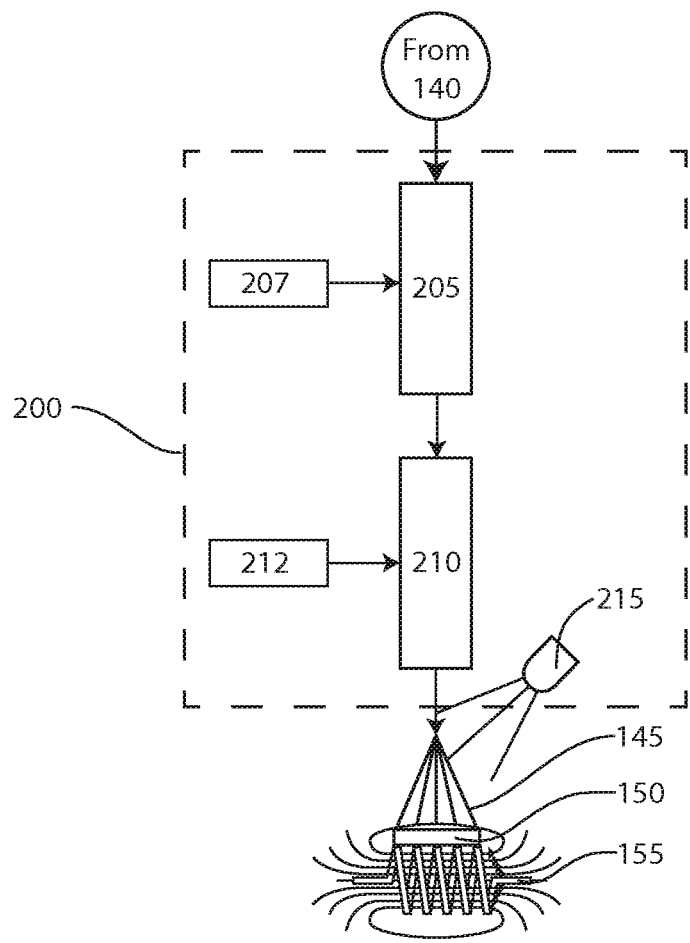
FIG. 2 is a high level flow diagram that conceptually illustrates a copolymerization subsystem for producing a polymer according to principles of the invention.

Using the subsystem 200 as conceptually shown in FIG. 2, a variety of volatile molecular species can be mixed with the xylylene monomer reaction products to make a gas phase material. Reaction chamber 140 output of monomer is fed into a mixing junction 205 with a volatile fluid 207 (e.g., evaporated liquid or gas) at a temperature generally in the range of 70° C. to 500° C. The range is dependent upon the vapor pressure of the adjunct material that is to be mixed with the xylylene (i.e., Puralene) monomer. This output is then adjusted to the desired temperature at mixing junction 210 to provide for the incorporation of an optional initiator 212. This gaseous mixture is then targeted onto a substrate 150, i.e., a material to be coated or collected as a bulk product. An optional photoinitiation of the polymerization process can be incorporated by the exposure of the material to a light energy, hv, from a light source 215. Alternatively, the reaction may be controlled by temperature and time to proceed to a desired completion point.

Optionally, permittivity of the deposited polymer is enhanced by exposing the condensing reaction products 145 to a magnetic and/or electric field, as described above. To the output of the reactions described above, the gaseous stream of reaction product 145 is directed to a cool solid surface 150. Illustratively, the surface target 150 may be immersed in a magnetic field 155 and/or an electric field.

The thickness of a Puralene™ coating (with or without modification in the subsystem 200) may range from 5 to 30 nm to greater than 10 microns.

Figure 3:
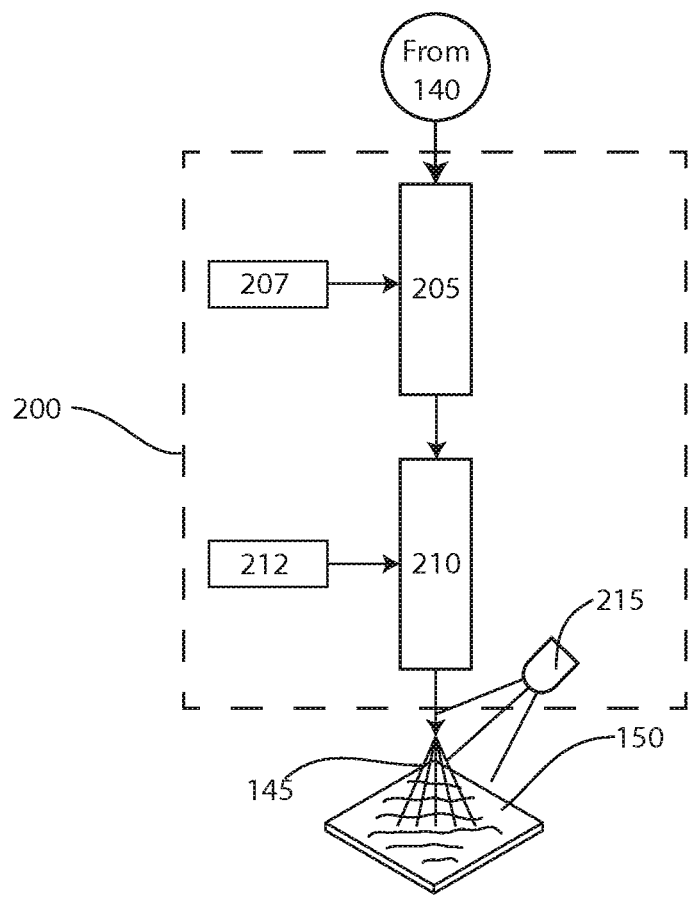
FIG. 3 is a high level flow diagram that conceptually illustrates another copolymerization subsystem for producing a polymer according to principles of the invention.

As another example, using the subsystem 200 as conceptually shown in FIG. 3, a variety of volatile molecular species can be mixed with the xylylene monomer reaction products to make a gas phase material. Again, reaction chamber 140 output of monomer is fed into a mixing junction 205 with a volatile fluid 207 (e.g., evaporated liquid or gas) at a temperature generally in the range of 70° C. to 500° C. The range is dependent upon the vapor pressure of the adjunct material that is to be mixed with the xylylene (i.e., Puralene) monomer. This output is then adjusted to the desired temperature at mixing junction 210 to provide for the incorporation of an optional initiator 212. This gaseous mixture 145 is then targeted onto a substrate 150, i.e., a material to be coated or collected as a bulk product. An optional photoinitiation of the polymerization process can be incorporated by the exposure of the material to a light energy, hv, from a light source 215. Alternatively, the reaction may be controlled by temperature and time to proceed to a desired completion point. In this exemplary embodiment, the deposited material is not subjected to a permittivity enhancing magnetic or electric field.

Figure 4:
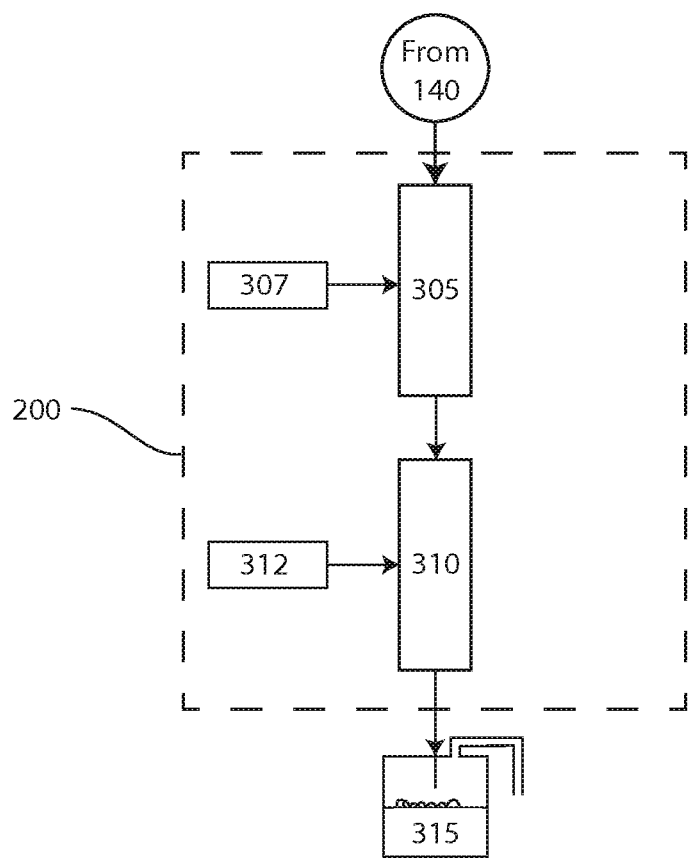
FIG. 4 is a high level flow diagram that conceptually illustrates yet another copolymerization subsystem for producing a polymer according to principles of the invention.

As another example, using the subsystem 200 as conceptually shown in FIG. 4, reaction chamber 140 output of monomer is fed into a mixing junction 305 with a volatile fluid 307 (e.g., evaporated liquid or gas) at a temperature generally in the range of 70° C. to 500° C. At mixing junction 310, the substances are mixed with a volatile initiator 312 and the mixed gases are trapped in a condenser 315 at low temperature. The range of temperatures the condenser operates is at a point to where condensation of the products of the reaction can take place. This temperature varies depending upon the reactants. Generally a low temperature such as the range from −30° C. to greater than 400° C. may be used. The exact temperature required is dependent upon the reactants that are being used. The condenser 315 may or may not contain a solvent to help trap the reactive species or provide a medium for further reaction to take place. This monomer by itself or with the other monomers mixed may be an optionally solvent-trapped species. This trapped material can optionally be subsequently mixed with yet another desired monomer, inert material, or reactive substance to the point of intimate heterogeneous contact or homogeneous mixing. The mixed material is then allowed to polymerize, react, or act as required for the intended application.

The following compounds (Table 1) have been examined for ability to copolymerize with the Puralene monomers synthesized by the Carver process, as described above.

TABLE 1

| Co-monomer name | Co-monomer structure |
|---|---|
| 2-carboxyethyl acrylate | |
| α-terpinene | |
| Cyclohexene | |
| (R)-(+)-limonene | |
| Linalool | |
| Dipentene | |
| (−)-(α)-pinene | |
| (R)-(−)-carvone 3-(trimethoxysilyl) propyl methacrylate | |
| (+)-(α)-terpinene | |

The ability of the Puralene monomer to copolymerize in a facile fashion with these stable yet potentially reactive olefinic compounds is somewhat unexpected. Their ability to form smooth pore-free films is a desired property that is certainly enhanced by the ability of the Puralene monomer to help control pore formation.

The subsystem 200 as shown in FIG. 3 can also be used as a direct gas phase applicator or spray to coat surfaces such as a glass fiber. In this way a composite materials similar to a glass filled epoxy can be created. This material would have uses such as glass filled boat hull, roofing materials, pressure vessels. Other reinforcing materials such as carbon fibers and nanotubules are particularly desirable due to their affinity for the Puralene coating. Cloth materials have also been coated with water repellent coatings such as described in this disclosure. Carbon containing metal compounds (WC) are examples of materials that can be coated.

Materials that may have a lack of UV stability, temperature stability, mechanical strength, lubrication (low friction applications), water, oxygen, or other chemical resistant behaviors may be improved with this method of protection.

Coatings and bulk polymers produced by copolymerization of Puralene monomer according to principles of the invention may be useful for the following applications:
1) Cloths
2) Metals
3) Fibers
4) Wires
5) Wood
6) Fiberglass
7) Carbon fiber, graphite, or nanoporous carbon structures
8) Printed Circuit Boards (PCBs)
9) Polymers such as
   a. Polyimides
   b. Polyamides
   c. Tetrafluoroethlenes and other fluorinated materials
   d. Polyethylenes
   e. Polypropylenes
   f. Polyvinyl compounds While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A method, comprising steps of:
   reacting p-xylene with a monatomic oxygen source to produce p-xylylene in monomeric form; and
   mixing the p-xylylene in monomeric form with a copolymerization compound, said copolymerization compound comprising a compound that copolymerizes with the p-xylylene in monomeric form, said p-xylylene in monomeric form and said copolymerization compound being in gaseous form, and, after mixing, comprising a mixture.

2. The method according to claim 1, said step of reacting p-xylene with a monatomic oxygen source to produce p-xylylene in monomeric form being performed at atmospheric pressure.

3. The method according to claim 2, the monatomic oxygen source comprising nitrous oxide.

4. The method according to claim 2, the monatomic oxygen source comprising ionized diatomic oxygen.

5. The method according to claim 1, said step of reacting p-xylene with a monatomic oxygen source to produce p-xylylene in monomeric form being performed in an environment heated to 350° C. to 800° C.

6. The method according to claim 1, said step of reacting p-xylene with a monatomic oxygen source to produce p-xylylene in monomeric form being performed at a stoichiometric ratio of xylene to monatomic oxygen source of 0.8 to 1.2 per equivalent of monomer.

7. The method according to claim 1, said copolymerization compound comprising an olefinic compound.

8. The method according to claim 1, said copolymerization compound comprising a monomer selected from 2-carboxyethyl acrylate, α-terpinene, cyclohexene, (R)-(+)-limonene, linalool, dipentene, (−)-(α)-pinene, (R)-(−)-carvone, 3-(trimethoxysilyl)propyl methacrylate, and (+)-(α)-terpinene.

9. The method according to claim 1, further comprising, after mixing the p-xylylene in monomeric form with a copolymerization compound, depositing the mixture on a substrate.

10. The method according to claim 9, further comprising controlling temperature of the substrate to promote solidification of the deposited mixture.

11. The method according to claim 1, further comprising, after mixing the p-xylylene in monomeric form with a copolymerization compound, exposing the mixture to photoinitiating light energy.

12. The method according to claim 1, further comprising trapping the mixture in a condenser, the condenser having a temperature at which condensation of the mixture takes place.

13. The method according to claim 12, said condenser having a temperature of at least −30° C.

14. The method according to claim 12, said condenser containing a solvent to facilitate trapping.

15. The method according to claim 12, further comprising mixing the trapped mixture with a tertiary substance selected from a monomer, a reactive substance and an inert material.

16. The method according to claim 1, wherein reacting the p-xylene with the monatomic oxygen source to produce p-xylylene in monomeric form comprises combining the p-xylene with the monatomic oxygen source at atmospheric pressure in an environment heated to 350° C. to 800° C.

17. The method according to claim 1 wherein the copolymerization compound is an olefin, a vinyl-containing compound compound, an alkynyl-containing compound, an allyl-containing compound, a carbonyl-containing compound, a cyclic ether, a cyclic acetale, a cyclic amide, or an oxazoline.

18. A method, comprising:
   reacting p-xylene with a monatomic oxygen source to produce p-xylylene in monomeric form;

mixing the p-xylylene in monomeric form with a copolymerization compound, said copolymerization compound comprising a compound that copolymerizes with the p-xylylene in monomeric form, said p-xylylene in monomeric form and said copolymerization compound being in gaseous form, and, after mixing, comprising a mixture;

after mixing the p-xylylene in monomeric form with a copolymerization compound, depositing the mixture on a substrate; and (i) exposing the deposited mixture to a photoinitiating light energy, or (ii) exposing the deposited mixture to a permittivity enhancing field.

19. The method according to claim 18, wherein the deposited mixture is exposed to a permittivity enhancing field, the permittivity enhancing field comprising a magnetic field.

20. The method according to claim 18, wherein the deposited mixture is exposed to a permittivity enhancing field, the permittivity enhancing field comprising an electric field.

* * * * *